US008355867B2

(12) United States Patent
Vacher et al.

(10) Patent No.: US 8,355,867 B2
(45) Date of Patent: Jan. 15, 2013

(54) METHOD AND SYSTEM FOR DETECTING MULTIPLE PATHS IN A SYSTEM OF SATELLITE NAVIGATION

(75) Inventors: Charlie Vacher, Paris (FR); Guillaume Ibanez, Paris (FR); Jean-Claude Goudon, Paris (FR)

(73) Assignee: SAGEM Defense Securite, Paris (FR)

( * ) Notice: Subject to any disclaimer, the term of this patent is extended or adjusted under 35 U.S.C. 154(b) by 247 days.

(21) Appl. No.: 12/679,887

(22) PCT Filed: Sep. 24, 2008

(86) PCT No.: PCT/EP2008/062792
§ 371 (c)(1),
(2), (4) Date: Mar. 24, 2010

(87) PCT Pub. No.: WO2009/040381
PCT Pub. Date: Apr. 2, 2009

(65) Prior Publication Data
US 2010/0211313 A1   Aug. 19, 2010

(30) Foreign Application Priority Data
Sep. 28, 2007   (FR) ..................................... 07 57958

(51) Int. Cl.
*G01C 21/00*   (2006.01)
(52) U.S. Cl. ..................................... 701/478.5; 701/469
(58) Field of Classification Search ................ 701/478.5
See application file for complete search history.

(56) References Cited

U.S. PATENT DOCUMENTS

| 5,631,838 | A | 5/1997 | Ishikawa et al. | |
| 6,268,824 | B1* | 7/2001 | Zhodzishky et al. | 342/357.31 |
| 6,377,891 | B1 | 4/2002 | Gilbert | |
| 2002/0021241 | A1* | 2/2002 | Zhodzishky et al. | 342/357.02 |
| 2002/0132579 | A1* | 9/2002 | Hart et al. | 455/12.1 |
| 2003/0083816 | A1* | 5/2003 | Imakado et al. | 701/213 |
| 2006/0271294 | A1* | 11/2006 | Mizuochi | 701/213 |
| 2008/0129598 | A1* | 6/2008 | Godefroy et al. | 342/450 |
| 2008/0180336 | A1* | 7/2008 | Bauregger | 343/753 |

FOREIGN PATENT DOCUMENTS
EP   1 775 598 A2   4/2007

* cited by examiner

*Primary Examiner* — Mary Cheung
*Assistant Examiner* — Michael D Lang
(74) *Attorney, Agent, or Firm* — Blakely, Sokoloff, Taylor & Zafman

(57) ABSTRACT

According to a first aspect, the invention relates to a method for controlling the navigation system of a carrier (P) receiving signals from a plurality of transmitters ($T_1$-$T_3$) and capable of measuring a pseudo-distance to each transmitter, wherein the elevation of each of the transmitters ($T_1$-$T_3$) is controlled relative to the horizontal (H) of the carrier (P), and a navigation solution is developed from the pseudo-distances (Pd-a) for which the elevation of the corresponding transmitter is higher than a minimum elevation (Em), characterized in that it comprises carrying out a discrimination of the multiple routes from the pseudo-distances (formula I) measured for the transmitters ($T_3$) having an elevation lower than the minimum elevation (Em), and further retaining, during the development of the navigation solution, the pseudo-distances (Pd-ad) authorized after said discrimination. The invention also relates to a navigation system capable of implementing the method according to the first aspect of the invention.

6 Claims, 3 Drawing Sheets

METHOD AND SYSTEM FOR DETECTING MULTIPLE PATHS IN A SYSTEM OF SATELLITE NAVIGATION

This is a non-provisional application claiming the benefit of International application number PCT/EP2008/062792 filed Sep. 24, 2008.

The field of the invention is that of navigation systems for an aeronautical or earthborne carrier, comprising a satellite positioning receiver, for example a GPS receiver.

The invention more particularly relates to a navigation system and a method for controlling such a system capable of ensuring the integrity of the navigation solution provided by such a system.

In the field of navigation systems, and in particular for navigation systems using pseudo-distances provided by a satellite positioning system, one of the major difficulties and regular source of positioning errors is the management and detection of indirect multiple paths corresponding to a reflection of the signal emitted by the satellite before reaching the receiver.

In addition to significantly degrading the position calculated by the GPS receiver, such phenomena actually affect the integrity of the position calculated by the GPS receiver to the extent that they are not processed by conventionally applied integrity verification mechanisms.

A block diagram for Receiver Autonomous Integrity Monitoring (or RAIM) conventionally applied in a GPS receiver is illustrated in FIG. 1.

The receiver R has an antenna 1 capable of receiving GPS signals from a plurality of satellites $T_1$-$T_5$.

The receiver R includes means 10 adapted for calculating for each GPS signal from a satellite $T_1$-$T_5$ tracked by the receiver, a set of raw navigation measurements (also designated as raw GPS measurements). These raw navigation measurements typically comprise pseudo-distances, pseudo-velocities, associated performance indicators—for example the UERE (User Equivalent Range Error) indicator, designating the error on the receiver-satellite distance measurement—as well as the corresponding UTC (Coordinated Universal Time) measurement time.

The sets of raw navigation data are sent to an RAIM module 20 which monitors the global consistency of the constellation of satellites while using all the raw GPS measurements actually provided by the calculation means 10, and excludes the raw measurements appearing as non-consistent.

The raw measurements remaining at the end of the RAIM process are marked as being "valid". These valid measurements are then used for elaborating the navigation solution, through a pure GPS navigation filter 30, or further through an inertial/GPS hybrid navigation filter 40. The navigation solution typically comprises the PVT (Position/Velocity/Time) navigation parameters.

It is therefore understood that depending on the RAIN integrity autonomous monitoring, the raw measurements calculated for the whole of the satellites tracked by the receiver are taken into account. Next, constellation inconsistency will be detected among all these raw measurements, in order to exclude, if need be, the raw measurements at the origin of this inconsistency.

The result of this is that the raw measurements marred with errors, but which do not generate any constellation inconsistency, are not detected and/or excluded by RAIN monitoring. Such measurements are then marked as being valid, and used for elaborating the navigation solution.

This is for example the case of raw measurements corresponding to an indirect multiple path, which, as seen earlier, however affect the integrity of the navigation solution.

There is therefore a need for improving integrity monitoring, notably for limiting the impact of indirect multiple paths, while avoiding the use of raw measurements marred with errors in elaborating the navigation solution, such as those corresponding to an indirect multiple path (and in particular those corresponding to a purely indirect multiple path for which only the reflected signal but not the direct signal is received by the navigation system).

The object of the invention is to meet this need, and to propose for this purpose, according to a first aspect, a method for controlling a carrier navigation system receiving signals from a plurality of transmitters and being able to measure a pseudo-distance from each transmitter, wherein the elevation of each of the transmitters is checked with respect to the horizontal of the carrier and a navigation solution is elaborated from pseudo-distances for which the elevation of the corresponding transmitter is higher than a minimum elevation, characterized in that a discrimination of the multiple paths is achieved from the measured pseudo-distances for the transmitters for which the elevation is lower than a minimum elevation, and the authorized pseudo-distances after said discrimination are further retained in elaborating the navigation solution.

Certain preferred, but non-limiting aspects of this method are the following:
- the discrimination of the multiple paths consists in monitoring the consistency of each of the pseudo-distances measured for the transmitters for which the elevation is lower than the minimum elevation with a navigation solution exclusively elaborated with the measured pseudo-distances for the transmitters for which the elevation is higher than the minimum elevation;
- the consistency check includes, for a measured pseudo-distance for a transmitter for which the elevation is lower than the minimum elevation, a measurement of the deviation between said pseudo-distance and a pseudo-distance with said transmitter estimated by means of measured pseudo-distances for the transmitters for which the elevation is higher than the minimum elevation;
- the discrimination of the multiple paths comprises, for a not directly authorized transmitter, the comparison of the measured pseudo-distance for said transmitter with a pseudo-distance to said transmitter calculated from information on position and position standard deviation associated with the carrier, said information being elaborated from pseudo-distances for which the elevation of the corresponding transmitter is higher than the minimum elevation;
- the minimum elevation is modified depending on a navigation phase of the carrier.

According to a second aspect, the invention relates to a navigation system intended to be integrated into a carrier, comprising means for receiving signals from a plurality of transmitters and being capable of measuring a pseudo-distance to each transmitter, as well as means for checking the elevation of each of the transmitters relatively to the horizontal of the carrier, and means for elaborating a navigation solution from pseudo-distances for which the elevation of the corresponding transmitter is higher than a minimum elevation, the system being characterized in that it includes means for discriminating multiple paths among the pseudo-distances measured for the transmitters for which the elevation is lower than the minimum elevation, and in that the means for elaborating a navigation solution further use authorized pseudo-distances after said discrimination.

Other aspects, objects and advantages of the present invention will become better apparent upon reading the following detailed description of preferred embodiments thereof, given as a non-limiting example and made with reference to the appended drawings wherein:

FIG. 1, already commented upon, is a diagram of a navigation system applying RAIM integrity autonomous monitoring;

The invention according to a first aspect relates to a method for controlling a navigation system of an (either aeronautical or earthborne) carrier, the system comprising a receiver capable of receiving signals from a plurality of transmitters, and also being capable of measuring for each transmitter, a pseudo-distance between the receiver and said transmitter, and elaborating a navigation solution from a plurality of measured pseudo-distances.

In the following, the example of the satellite positioning GPS system will be taken. However it will be understood that the invention is not limited to this particular system, but is intended to extend to any type of satellite positioning system of the GNSS (Global Navigation Satellite System) type, in particular to the future Galileo system.

Figure 1:
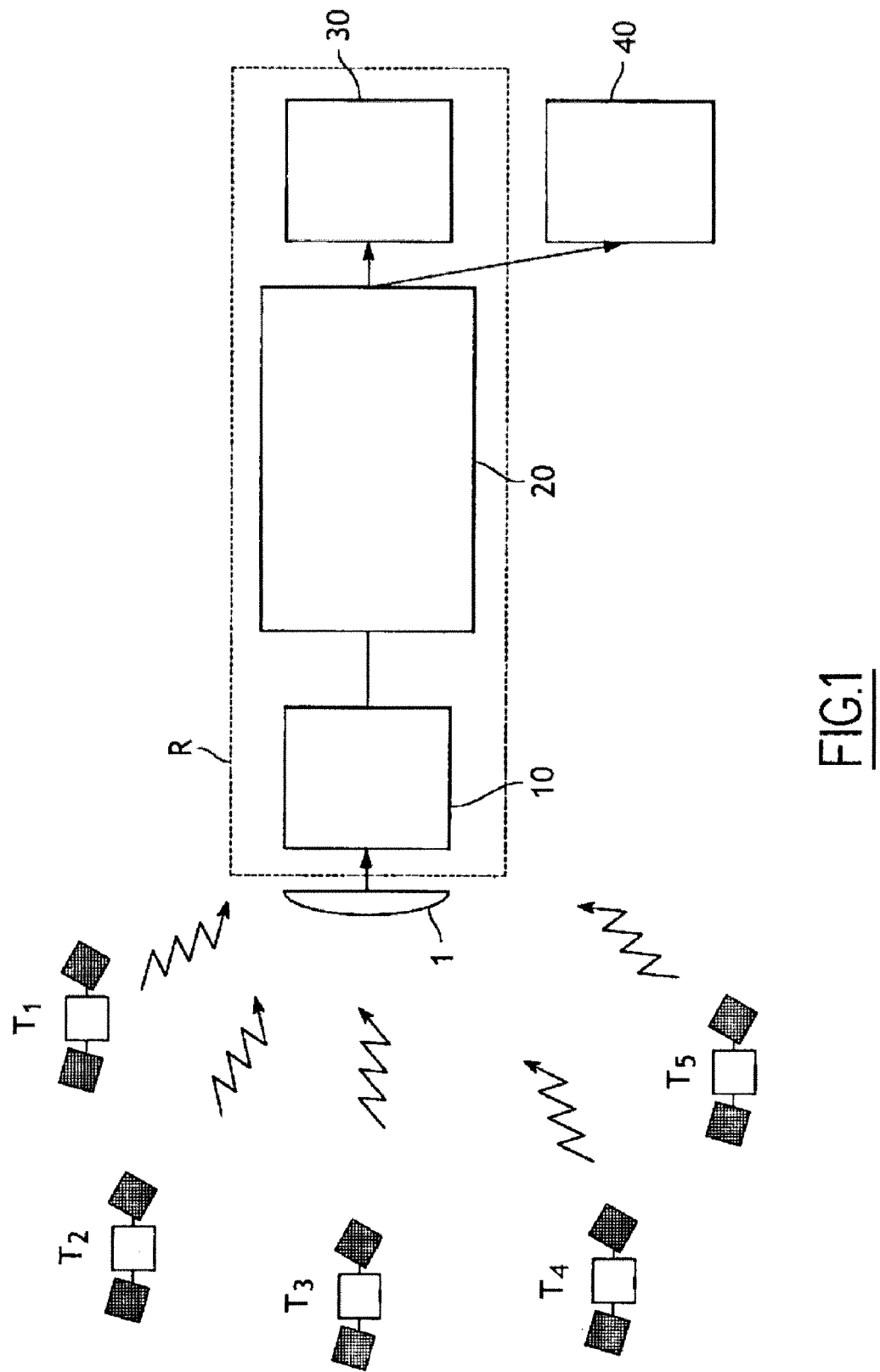
Figure 2:
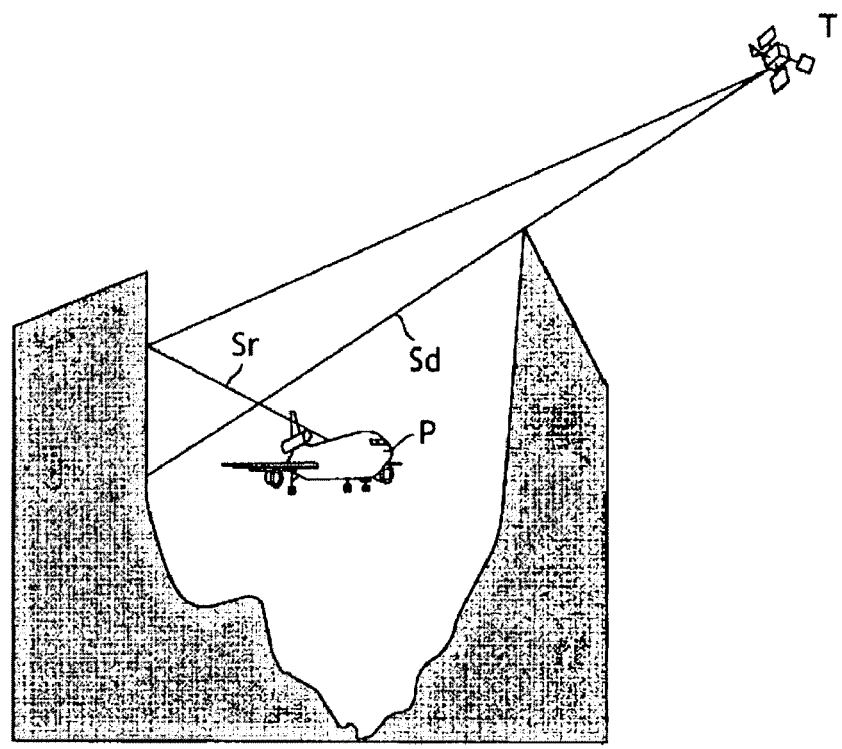
FIG. 2 is a diagram illustrating a purely indirect multiple path for which only the reflected signal, but not the direct signal, is received by the navigation system of a carrier.

A possible case of occurrence of a purely indirect multiple path is illustrated in FIG. 2, according to which only the reflected signal Sr, but the direct signal Sd, is received by the navigation system of a carrier P (here an aeronautical carrier) from a transmitter T. In the case of FIG. 2, the multiple path originates from the fact that the transmitter T is not located in a sufficiently high position relatively to the carrier P so that the direct signal Sd may reach the carrier.

Figure 3:
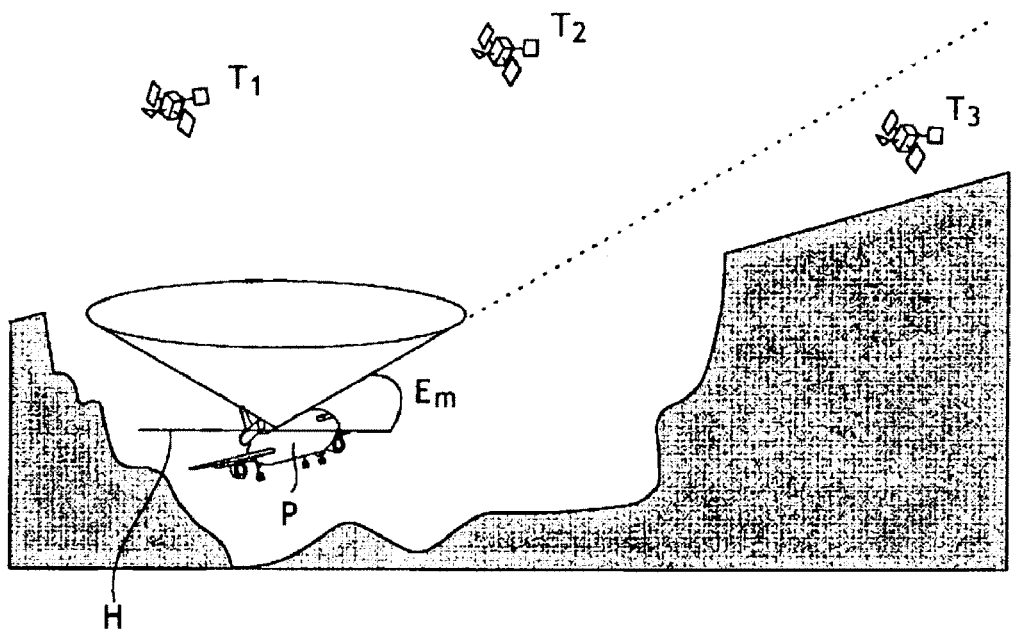
FIG. 3 is a diagram illustrating the elevation checking principle according to the invention.

FIG. 3 illustrates the principle of checking elevation as applied within the scope of the invention. According to the invention, the elevation of each of the transmitters $T_1$-$T_3$ is checked relatively to the horizontal H of the carrier P, so as to distinguish the transmitters $T_1$-$T_2$ having an elevation higher than a minimum elevation Em from the transmitters T3 having a lower elevation than the minimum elevation Em. The transmitters $T_3$, which risk causing multiple paths insofar that they are not located in a sufficiently high position relatively to the carrier P, are thereby located.

Next, for elaborating the navigation solution, the whole of the pseudo-distances is retained for which the elevation of the corresponding transmitter is higher than the minimum elevation Em.

It is specified here that by "elevation" is meant the angle formed between the carrier-satellite line and the horizontal plane passing through the carrier. Elevation thus varies between 0° and 90° depending on the height of the satellite in the sky (in other words the elevation varies from the horizon to the vertical position above the carrier).

The elevation of the satellite as seen by the carrier may notably be calculated by using information relating to the respective positions of the carrier and of the satellite. This elevation angle is then compared with an elevation angle corresponding to said minimum elevation Em and predetermined for example depending on the carrier and/or on the flight phase.

It is also specified here that by "horizontal of the carrier" is meant the horizontal plane passing through the carrier (this is the plane perpendicular to the vertical passing through the carrier).

Figure 4:
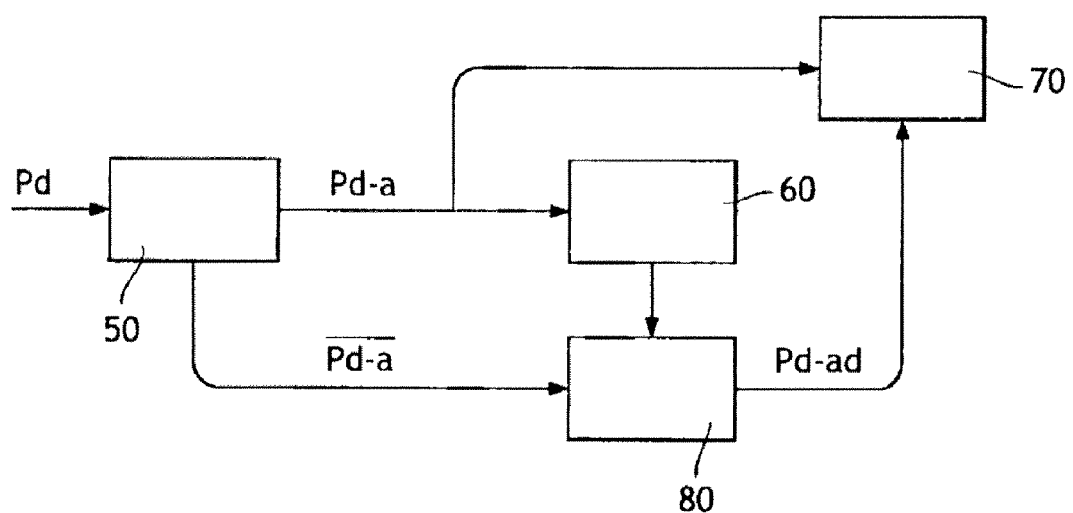
FIG. 4 is a diagram illustrating a navigation system according to a possible embodiment of the second aspect of the invention.

With reference to FIG. 4, the navigation system according to the second aspect of the invention, includes means for checking the elevation 50 of each of the transmitters $T_1$-$T_3$ relatively to the horizontal H of the carrier P. With these means 50, it is thereby possible to discriminate among the whole of the measured pseudo-distances Pd, the pseudo-distances Pd-a (also designated as directly authorized pseudo-distances) measured for the transmitters for which the elevation is higher than the minimum elevation (the transmitters $T_1$ and $T_2$ in FIG. 3) of the not directly authorized pseudo-distances $\overline{Pd\text{-}a}$ which are measured for the transmitters for which the elevation is lower than the minimum elevation (the transmitter $T_3$ in FIG. 3).

The navigation system further includes a filter 60 said to be a minimum elevation filter, which only uses for elaborating a navigation solution the directly authorized pseudo-distances Pd-a for which the corresponding transmitter $T_1$-$T_2$ is located higher than the minimum elevation Em relatively to the horizontal H of the carrier P, and for which it is therefore certain that they are not affected by indirect multiple paths.

The minimum elevation Em to be considered may of course vary from one carrier to another. For example, a minimum elevation value Em will be used, different for an earthborne carrier from the one used for an aeronautical carrier.

As a purely illustrative example, a minimum elevation of 30° may be considered for an airplane if it is considered that the airplane will never be brought to fly in a canyon having an sky aperture angle of less of 120°.

Of course, the minimum elevation may change depending on the application, and even vary depending on the use of the carrier. Thus, the minimum elevation may be modified depending on a navigation phase of the carrier. Considering an airplane as an example, it is for example possible to use a different minimum elevation value depending on whether the navigation phase is a low altitude flying phase or an ocean flying phase (wherein moreover this function may even be deactivated, for example by considering zero minimum elevation).

The minimum elevation filter 60, provided for supplying a navigation solution from measured pseudo-distances Pd-a directly authorized by the elevation check (i.e. those corresponding to transmitters having an elevation higher than the minimum elevation), may be a pure GPS filter (for example of the type for calculating the position by the Bancroft method) or further an inertial/GPS hybrid filter.

According to the invention, a discrimination of the multiple paths among the measured not directly authorized pseudo-distances $\overline{Pd\text{-}a}$, for the transmitters $T_3$, the elevation of which is lower than the minimum elevation (Em) and not used by the minimum elevation filter 60 is performed in order to elaborate a navigation solution, and the authorized pseudo-distances Pd-ad after said discrimination are further retained for elaborating the navigation solution.

For this purpose, the navigation system includes means for discrimination of the multiple paths 80 which use the minimum elevation filter 60 in order to discriminate among the measured pseudo-distances $\overline{Pd\text{-}a}$ for the transmitters ($T_3$) for which the elevation is lower than the minimum elevation and not used by the minimum elevation filter 60, those Pd-ad ones which may however be used for elaborating a navigation solution.

The navigation system may thus further include a so-called navigation filter 70 capable of providing navigation information from all the information on available pseudo-distances. This navigation filter 70 thus uses at least all of the directly authorized pseudo-distances Pd-a which are used by the minimum elevation filter 60, as well as the pseudo-distances Pd-ad not used by the minimum elevation filter 60 but which the means for discriminating multiple paths 80 will have however authorized.

It will be retained here that the use of an inertial/GPS hybrid filter for the minimum elevation filter 60 has the advantage of being able to produce the function for detecting multiple paths even if the number of pseudo-distances Pd-a emitted by the satellites above the minimum elevation is small.

Such a hybrid filter actually allows continuation of the elaboration of a navigation solution even if the number of satellites above the minimum elevation becomes less than 4 (the position is thus further calculated, unlike a pure GPS filter which no longer provides any position if the number of satellites becomes less than 4).

According to a first alternative, only the directly authorized pseudo-distances Pd-a and used by the minimum elevation filter 60 are authorized in the navigation filter 70. This alternative has the advantage of being simple and of operating systematically, and in every case (whether the navigation filter 70 is an inertial/GPS hybrid filter or a pure GPS filter). This may however prove to be a penalty from the point of view of the performance of the navigation filter and of its availability (in particular for a pure GPS navigation filter).

According to a second alternative, a discrimination of the multiple paths is carried out among the not directly authorized pseudo-distances $\overline{Pd\text{-}a}$ measured for the transmitters ($T_3$ in the example of FIG. 3) for which the elevation is lower than the minimum elevation, and for elaborating the navigation solution, the authorized pseudo-distances Pd-ad are further retained after said discrimination. The navigation filter 70 thereby uses all the directly authorized pseudo-distances Pd-a, as well as the not directly authorized pseudo-distances Pd-ad and not used by the minimum elevation filter 60, but which are however authorized by the means for discriminating multiple paths 80.

The discrimination means 80 may use information on position and position standard deviation, calculated by the minimum elevation filter 60. More specifically, the discrimination means 80 calculate, from this position and position standard deviation information associated with the carrier and calculated by the minimum elevation filter 60, the pseudo-distance—and the associated standard deviation—of the not directly authorized satellite, and compare it with the actual measurement (not directly authorized pseudo-distance $\overline{Pd\text{-}a}$). Under the assumption that the result of this comparison is less than ±n sigma (n varying depending on the accepted error level), the satellite may be revalidated (its pseudo-distance of the Pd-ad type may then be used, in the navigation filter 70). In the opposite case, the satellite remains invalidated.

The discrimination means 80 may also test the consistency by a hypothesis test (for example of the RAIM type) of the system consisting of directly authorized pseudo-distances Pd-a, and of a not directly authorized pseudo-distance $\overline{Pd\text{-}a}$ to be tested recursively (N tests if N not directly authorized pseudo-distances $\overline{Pd\text{-}a}$ are to be tested).

The discrimination of the multiple paths may thus consist in a check of the consistency of each of the pseudo-distances $\overline{Pd\text{-}a}$, measured for the transmitters ($T_3$) for which the elevation is lower than the minimum elevation, with an elaborated navigation solution, by the minimum elevation filter 60, exclusively with the directly authorized pseudo-distances Pd-a (measured for the transmitters ($T_1$-$T_2$) for which the elevation is higher than the minimum elevation). It is specified here that it is quite possible to actually verify the consistency of a not directly authorized satellite by comparing raw navigation measurements other than the pseudo-distances, such as for example the pseudo-velocities or further the pseudo "delta ranges".

The consistency check may include for the not directly authorized pseudo-distance $\overline{Pd\text{-}a}$ measured for the transmitter $T_3$, a measurement of the deviation between said pseudo-distance $\overline{Pd\text{-}a}$ and a pseudo-distance between the receiver and the transmitter $T_3$, estimated by means of the directly authorized pseudo-distances Pd-a which are measured for the transmitters $T_1$ and $T_2$ for which the elevation is higher than the minimum elevation.

For this purpose, it is notably possible to evaluate the position of the receiver by using the whole of the pseudo-distances Pd-a measured for the transmitters $T_1$ and $T_2$ with an elevation higher than the minimum elevation and directly authorized, and to estimate said pseudo-distance between the receiver and the transmitter $T_3$ from said evaluated position of the receiver and from almanac data relating to said transmitter.

It will have been understood that the invention proposes a method and a system allowing limitation of the impact of the indirect paths by detecting their presence before their use in the algorithm for calculating the position by the navigation algorithm. The result of this is a reduction of the impact of indirect multiple paths on the position calculated by the GNSS receiver, and an improvement of the integrity of this calculated position.

The invention claimed is:

1. A method for controlling the navigation system of a carrier (P) receiving signals from a plurality of transmitters ($T_1$-$T_3$) and capable of measuring for each transmitter a set of raw navigation parameters including a pseudo-distance to the transmitter, wherein the elevation of each of the transmitters ($T_1$-$T_3$) is checked relative to the horizontal (H) of the carrier (P) and a navigation solution is obtained from pseudo-distances (Pd-a) for which the elevation of the corresponding transmitter is higher than a minimum elevation (Em), wherein method includes the steps of:

carrying out a multiple paths discrimination among the pseudo-distances ($\overline{Pd\text{-}a}$) measured for the transmitters ($T_3$) for which the elevation is lower than the minimum elevation (Em), said discrimination including, for each transmitter for which the elevation is lower than the minimum elevation checking the consistency of a raw navigation measurement measured for the transmitter with a navigation solution obtained exclusively from the pseudo-distances measured for the transmitters for which the elevation is higher than the minimum elevation, and further retaining the pseudo-distances (Pd-ad) authorized after said discrimination in the obtained navigation solution.

2. The method according to claim 1, wherein the multiple paths discrimination comprises checking the consistency of each of the pseudo-distances $\overline{Pd\text{-}a}$ measured for the transmitters ($T_3$) for which the elevation is lower than the minimum elevation (Em) with the navigation solution obtained exclusively from the pseudo-distances (Pd-a) measured for the transmitters ($T_1$-$T_2$) for which the elevation is higher than the minimum elevation (Em).

3. The method according to claim 2, wherein the consistency check includes, for a pseudo-distance ($\overline{Pd\text{-}a}$) measured for a transmitter ($T_3$) for which the elevation is lower than the minimum elevation, a measurement of the deviation between said pseudo-distance ($\overline{Pd\text{-}a}$) and a pseudo-distance with said transmitter ($T_3$) estimated by the pseudo-distances (Pd-a) measured for the transmitters ($T_1$-$T_2$) for which the elevation is higher than the minimum elevation.

4. The method according to claim 2, wherein the consistency check comprises, for a pseudo-distance ($\overline{Pd\text{-}a}$) measured for a transmitter ($T_3$) for which the elevation is lower than the minimum elevation, the comparison of said pseudo-distance ($\overline{Pd\text{-}a}$) with a pseudo-distance to said transmitter ($T_3$) calculated from position and position standard deviation information associated with the carrier, said information being obtained from pseudo-distances (Pd-a) measured for transmitters for which elevation is higher than the minimum elevation (Em).

5. The method according to any of claims 1 to 4, wherein the minimum elevation is modified depending on a navigation phase of the carrier.

6. A navigation system for integrating into a carrier (P), comprising:

means for receiving signals from a plurality of tern ($T_1$-$T_3$), and capable of measuring for each transmitter a set of raw navigation parameters including a pseudo-distance to the transmitter, means for checking the elevation (10) of each of the transmitters ($T_1$-$T_3$) relative to the horizontal (H) of the carrier (P), and means (70) for obtaining a navigation solution from pseudo-distances (Pd-a) for which the elevation of the corresponding transmitter ($T_1$-$T_2$) is higher than a minimum elevation (Em), the system further comprising means (80) for discriminating multiple paths among the pseudo-distances ($\overline{Pd\text{-}a}$) measured for the transmitters ($T_3$) for which the elevation is lower than the minimum elevation (Em), said means (80) for discriminating multiple paths being configured for checking, for each transmitter for which the elevation is lower than the minimum elevation, the consistency of a raw navigation measurement measured for the transmitter with a navigation solution obtained exclusively from the pseudo-distances measured for the transmitters for which the elevation is higher than the minimum elevation, and means (70) for obtaining a navigation solution using the authorized pseudo-distances (Pd-ad) after said discrimination.

* * * * *

UNITED STATES PATENT AND TRADEMARK OFFICE
CERTIFICATE OF CORRECTION

PATENT NO. : 8,355,867 B2
APPLICATION NO. : 12/679887
DATED : January 15, 2013
INVENTOR(S) : Charlie Vacher et al.

It is certified that error appears in the above-identified patent and that said Letters Patent is hereby corrected as shown below:

In the Claims, Column 7, Claim 4, line 13, please delete "which elevation" and insert --which the elevation--.

Column 7, Claim 6, line 20, please delete "tern" and insert --transmitters--.

Signed and Sealed this
Fourth Day of June, 2013

Teresa Stanek Rea
*Acting Director of the United States Patent and Trademark Office*